US008357850B2

(12) United States Patent
Ye

(10) Patent No.: US 8,357,850 B2
(45) Date of Patent: Jan. 22, 2013

(54) HOUSING AND METHOD FOR MAKING THE SAME

(75) Inventor: Huan-Bing Ye, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 317 days.

(21) Appl. No.: 12/861,905

(22) Filed: Aug. 24, 2010

(65) Prior Publication Data

US 2011/0315421 A1    Dec. 29, 2011

(30) Foreign Application Priority Data

Jun. 24, 2010 (CN) .......................... 2010 1 0208468

(51) Int. Cl.
*H05K 5/00* (2006.01)
(52) U.S. Cl. .......... 174/50; 174/559; 174/560; 174/563; 361/679.02; 361/679.3; 361/796
(58) Field of Classification Search .................... 174/50, 174/520, 559, 560, 561, 562, 563, 535; 361/600, 361/601, 679.3, 679.56, 679.58, 724, 730, 361/796, 679.02
See application file for complete search history.

(56) References Cited

U.S. PATENT DOCUMENTS

| | | | |
|---|---|---|---|
| 3,635,305 A * | 1/1972 | Kunishi et al. .................. | 174/50 |
| 6,437,238 B1 * | 8/2002 | Annerino et al. ............... | 174/50 |
| 6,521,830 B1 * | 2/2003 | Platz .............................. | 174/50 |
| 7,688,574 B2 * | 3/2010 | Zadesky et al. ............ | 361/679.3 |
| 7,947,900 B2 * | 5/2011 | Cheng et al. ................... | 174/50 |
| 8,124,872 B2 * | 2/2012 | Vigorito et al. ................ | 174/50 |
| 8,148,633 B2 * | 4/2012 | Hung ............................. | 174/50 |

* cited by examiner

*Primary Examiner* — Angel R Estrada
(74) *Attorney, Agent, or Firm* — Altis Law Group, Inc.

(57) ABSTRACT

A housing includes a first base layer and a second base layer integrally combining with the first base layer. The first base layer is formed by a first injection mold, the first base layer has a first combining surface arranged with ribs. The second base layer combines with the first base layer to form the housing with a second injection mold. The second base layer has a second combining surface combining with the first combining surface. The second combining surface defines recesses to correspondingly receive the ribs.

8 Claims, 3 Drawing Sheets

HOUSING AND METHOD FOR MAKING THE SAME

BACKGROUND

1. Technical Field

The present disclosure relates to housings, and particularly, to a housing used in portable electronic devices and a method for making the housing.

2. Description of the Related Art

Housings of portable electronic devices may have a dual-layer structure made by dual injection moldings. Specifically, during the molding process, a first plastic layer is formed by injection of a first plastic material. A second plastic layer is then formed by an injection of a second material. The second plastic moldingly combines with the first plastic layer to form the housing. However, due to difference levels of shrinkage between the first and second plastic materials, it is easy to crack or break the housing, especially the peripheral of the housing.

Therefore, there is room for improvement within the art.

BRIEF DESCRIPTION OF THE DRAWINGS

Many aspects of the present housing and method for making the same can be better understood with reference to the following drawings. The components in the drawings are not necessarily drawn to scale, the emphasis instead being placed upon clearly illustrating the principles of the present housing and method for making the same. Moreover, in the drawings, like reference numerals designate corresponding parts throughout the several views.

DETAILED DESCRIPTION

Figure 1:
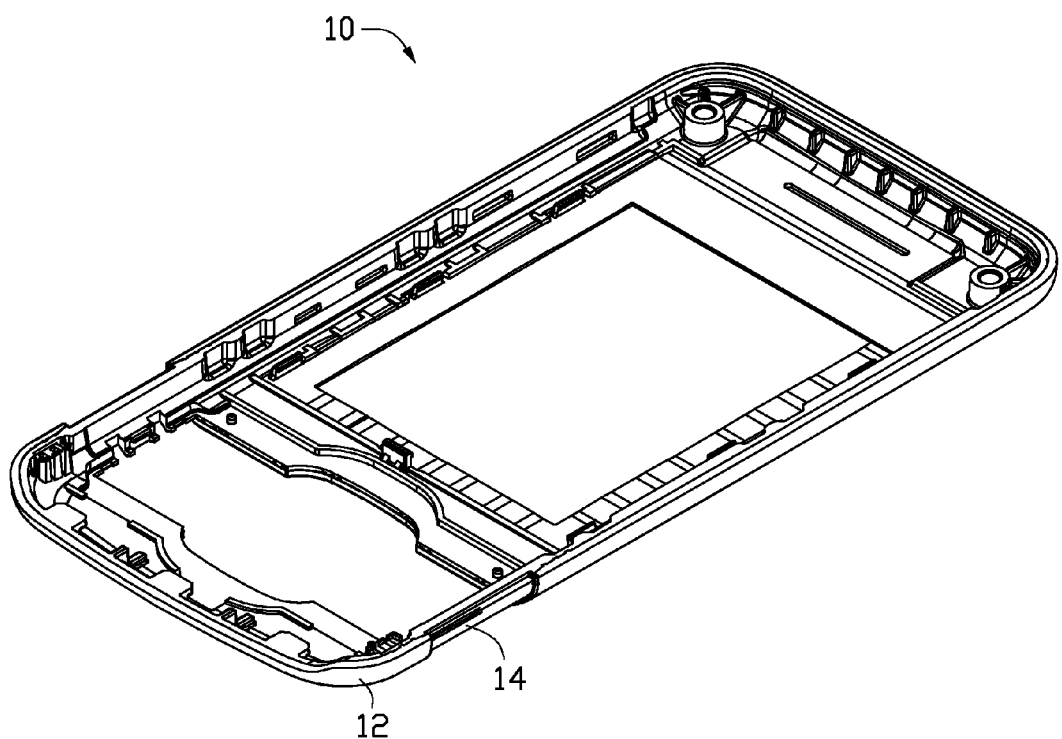
FIG. 1 is an exploded isometric view of an embodiment of a housing.
Figure 2:
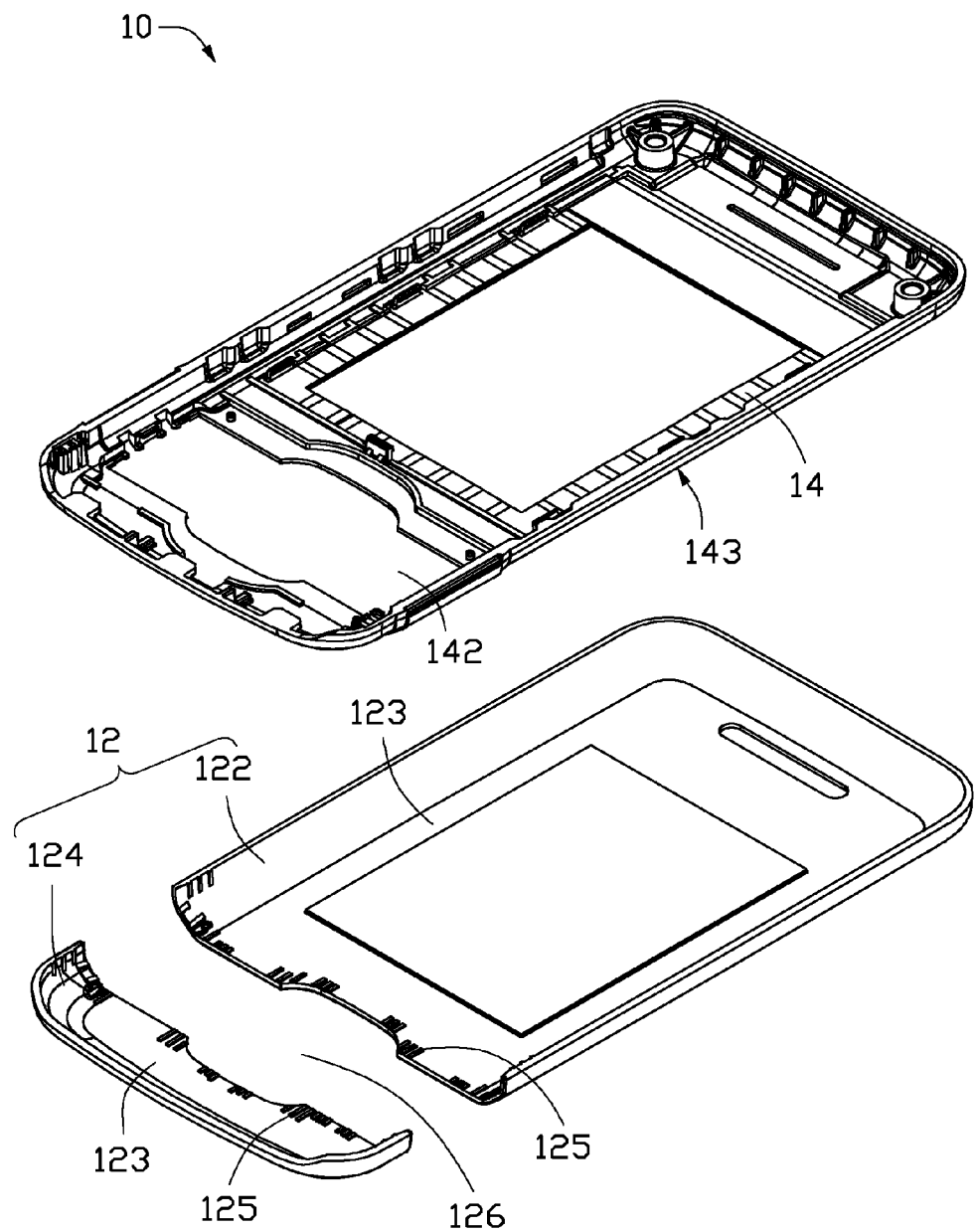
FIG. 2 is an integral isometric view of the housing shown in FIG. 1.

FIG. 1 shows an exemplary embodiment of a housing 10 used in a portable electronic device such as a mobile phone, or a personal digital assistant (PDA). The housing 10 includes a first base layer 12 and a second base layer 14. The first base layer 12 functions as an outer layer and the second base layer 14 functions as an inner layer relative to the outer layer. The first base layer 12 and the second base layer 14 can be integrally molded to form the housing 10.

The first base layer 12 may be injection molded using a first plastic material. The first base layer 12 includes a first base section 122 and a second base section 124 separated from the first base section 122 by a receiving gap 126. The first base layer 12 has a first combining surface 123 to combine with the second base layer 14, and the first combining surface 123 correspondingly includes the surfaces of the first base section 122 and the second base section 124. Ribs 125 are arranged on the first combining surface 123 around the receiving gap 126. The ribs 125 laterally extend along the first base layer 12. The position of the ribs 125 relative to the first base layer 12 and the distance between each two adjacent ribs 125 can be adjusted if needed.

The second base layer 14 integrally combines with the first base layer 12 with the injection molding of a second plastic material. The second base layer 14 has a receiving space 142 corresponding to receiving gap 126 of the first base layer 12, the receiving space 142 engages with the receiving gap 126 to receive a keypad (not shown). The second base layer 14 has a second combining surface 143 to combine with the first combining surface 123. The second combining surface 143 has recesses (not shown) defined therein to receive the corresponding ribs 125. The level of shrinkage difference between the first base layer 12 and the second base layer 14 enables the ribs 125 to lock in the recesses after the second base layer 14 is formed and cooled. Thus, the combining strength of the first base layer 12 and the second base layer 14 is much improved.

Figure 3:
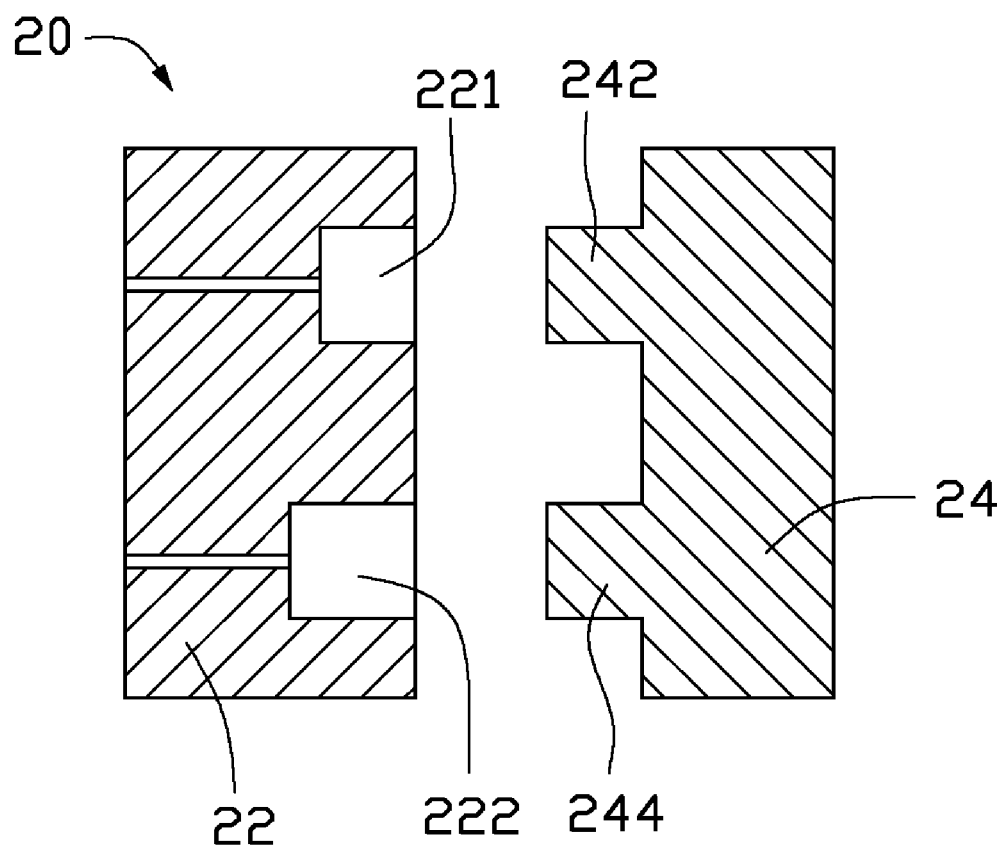
FIG. 3 is a cut-away, schematic view of a mold for making the housing shown in FIG. 1.

Referring to FIG. 3, to fabricate the housing 10, a mold 20 includes a female mold 22 and a male mold 24 engaging with the female mold 22. The female mold 22 defines a first cavity 221 and a second cavity 222. The second cavity 222 is substantially parallel with and deeper than the first cavity 221. The male mold 24 forms a first core 242 and a second core 244. The first core 242 and the second core 244 are substantially parallel with each other and have substantially the same structure, and correspondingly engage with the first cavity 221 and the second cavity 222.

During molding, the female mold 22 engages with the male mold 24, and the first cavity 221 engages with the first core 242 to form a first chamber (not shown). A first plastic material is injected into the first chamber by an injection machine (not shown), forming the first base layer 12. The first base layer 12 has the first combining surface 123 with the ribs 125 formed thereon.

The female mold 22 disengages from the male mold 24, and the first base layer 12 is attached on the first core 242, with the first combining surface 123 facing the female mold 22. Then, the male mold 24 rotates 180 degrees relative to the female mold 22, aligning the first core 242 and the second core 244 respectively with the second cavity 222 and the first cavity 221.

The female mold 22 moves again to engage with the male mold 24. The first core 242 carrying the first base layer 12 engages in the second cavity 222 to form a second chamber (not shown), with the first combining surface 123 of the first base layer 12 opposing the bottom of the second cavity 222. A second plastic material is injected into the second chamber, combining with the first base layer 12 to form the housing 10.

The second plastic material forms the second base layer 14 after cooled, the second base layer 14 has the second combining surface 143 combining with the first combining surface 123. The second combining surface 143 has recesses to lock the ribs 125. Then, the mold 20 is opened and the housing 10 can be taken out.

It is understood that the housing 10 can be fabricated by two molds instead of rotating the male mold 24 180 degrees relative to the female mold 22. Specifically, the first base layer 12 can be fabricated by a first mold and placed into a second mold for additional molding, in which a second plastic material is injected into the second mold to combine with the first base layer to form the housing 10.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A housing, comprising:
   a first base layer;
   a second base layer integrally combining with the first base layer; wherein:

the first base layer is formed by a first injection molding, the first base layer has a first combining surface having ribs thereon, the first base layer includes a first base section and a second section separated from the first base section with a receiving gap, the first combining surface correspondingly includes the surface of the first base section and the second base section, the second base layer combines with the first base layer to form the housing by a second injection molding, the second base layer has a second combining surface combining with the first combining surface, the second combining surface defines recesses to receive corresponding ribs.

2. The housing as claimed in claim 1, wherein the first base layer and the second base layer are made of different plastic materials.

3. The housing as claimed in claim 1, wherein the ribs are arranged at the periphery of the receiving gap.

4. The housing as claimed in claim 1, wherein the rib laterally extends along the first base layer.

5. A method for making a housing, comprising:
   fabricating a first base layer by injecting a first plastic material during a first injection molding step, forming ribs on a first combining surface of the first base layer, the first base layer including a first base section and a second section separated from the first base section with a receiving gap, the first combining surface correspondingly including a surface of the first base section and the second base section;
   fabricating a second base layer by injecting a second plastic material during a second injection molding, forming a housing by combining the second base layer with the first base layer, forming recesses on the second base layer for receiving the ribs therein.

6. The method for making a housing as claimed in claim 5, further comprising forming the first base layer in a mold by injection of the first plastic material, forming the housing in another mold by injection of the second plastic material combining with the first base layer, the second plastic material forms the second base layer.

7. The method for making a housing as claimed in claim 5, further comprising forming the housing in a mold, the mold includes a female mold and a male mold, the female mold defines a first cavity and a second cavity deeper than the first cavity, the male mold forms a first core and a second core same as the first core, one of the first core and the second core respectively engages with the first cavity and the second cavity.

8. The method for making a housing as claimed in claim 5, further comprising arranging the ribs at the periphery of the receiving gap.

* * * * *